Patented Aug. 23, 1949

2,479,643

UNITED STATES PATENT OFFICE 2,479,643

SULFONIC ACID-CATALYZED OIL-SOLUBLE PHENOL-ALDEHYDE RESINS

George A. Senior, Jr., Bloomfield, N. J., assignor to Bakelite Corporation, a corporation of New Jersey No Drawing. Application May 29, 1945, Serial No. 596,588

8 Claims. (Cl. 260—19)

This invention relates to oil-soluble resins of the phenolic type prepared from monohydric substituted phenols by reaction with formaldehyde. It is known that a phenol having an alkyl or aryl substituent on the ring in a position ortho or para to the hydroxyl can be made to yield a resin classifiable as oil-soluble. But there are many other factors involved beside oil-solubility—such as reaction conditions, melting point, ease of solubility in oils and mineral spirits of the resin, speed of drying of the resin-oil composition, etc. in addition to film requisites of durability, toughness, adhesion, resistance to acids, alkalies and moisture-penetration, etc.— that determine the utility of the substituted phenol. A resin for example that has been outstanding in its performance among substituted phenol-formaldehyde resins is one obtained from para-tertiary-butyl-phenol by reaction in molar proportions with formaldehyde using oxalic acid as a catalyst: it has a high melting point of 250°-280° F. (by the ball-and-ring method), and it can be directly dispersed in any proportion in the various drying oils without any previous reaction with rosin or drying oil, though upon refluxing the resin alone in an equal weight of xylol the solution becomes a gell-like mass; the resin-oil compositions have little tendency to skin, are stable with basic pigments, have an infinite tolerance for mineral spirits, and coatings through-dry into films of excellent durability and good chemical resistance. Another resin that has unequaled merit in many respects and has found extensive usage is one prepared from molar proportions of para-phenyl-phenol and formaldehyde with oxalic acid as the catalyst; it does not, in comparison with the butyl-phenol resin, have as high a melting point (195°-225° F.) nor is it as readily soluble in drying oils, but in combination with tung oil particularly the films thereof have been unexcelled with respect to durability, toughness, resistance to wear, and water resistance.

Both the p-tertiary-butyl phenol and the p-phenyl-phenol, however, are limited in quantity and not presently available except for highly specialized uses. It therefore has been a problem to find a substitute yielding an oil-soluble resin of commensurate properties.

As an instance, para-tertiary-amyl phenol is less closely restricted as to sale and use, and it is much more readily available. Resins have been previously made from it by following the customary practice of using molar ratios with formaldehyde and oxalic acid as the catalyst; but the resins have not been comparable in properties with the foregoing-mentioned resins, for they are relatively soft with a melting point of about 185°-210° F., they are much slower in bodying rate when combined with linseed oil than are the commercial p-tertiary-butyl-phenol and p-phenyl-phenol resins, and their varnishes dry at a much slower rate. Accordingly resins therefrom have not met the demand like those made from the other specified phenols.

It has now been found that surprisingly improved oil-soluble resins as to melting point are obtainable generally from phenols substituted in one of the three reactive positions (ortho and para to the hydroxyl) by alkyl or aryl groups higher than the methyl groups; moreover, they are distinguished by their extremely low volatility and by ready solubility in xylol and mineral spirits but insolubility in acetone from the commonly oxalic acid-catalyzed resins. To illustrate, a resin can be obtained from p-tertiary-amyl-phenol by the present invention that has a melting point of 280°-300° F. and a volatile loss when heated at 560° F. for 15 minutes of less than one per cent, while the oxalic acid-catalyzed butyl phenol resin loses from 3 to 4 per cent and the oxalic-catalyzed phenyl-phenol resin loses from 4 to 5 per cent by weight under the same conditions. These factors of high melting point and low volatility are of the utmost importance both in the processing of the resin with an oil and in imparting properties of rapid drying, increased hardness and durability under wide variations of temperature to coatings made from them.

The foregoing improvements in oil-soluble resins are accomplished by means of sulfonic acids of the substituted phenols as catalysts; preferably the sulfonic acid selected is that of the phenol ("self-sulfonic" acid) entering into the resin formation and especially the acid prepared by adding concentrated sulfuric acid to the phenol prior to its reaction with aldehyde to thus form a self-sulfonic acid in situ as the directing catalyst. Resin-forming reactions so catalyzed are unusually rapid and yield highly polymeric resins at very low concentrations of the acids. By the addition of concentrated sulfuric acid (or fuming sulfuric acid) to the phenol to form the sulfonic acid in situ, the amount of sulfuric acid can be as low as 0.03 to 0.05 per cent by weight of the phenol and yet have the effectiveness in rapidity of reaction (a maximum of about 2 hours as compared with 10 to 11 hours for the oxalic acid-catalyzed reactions) and increase in melting point of the resin comparable to about 5 per cent and more of concentrated sulfuric acid added to a mixture of phenol and aqueous formaldehyde. Such extremely small percentages of acids eliminate the necessity of the customary steps of washing and neutralizing the catalyst; and surprisingly these small percentages of acids not only give an increase in melting point but permit a lowering of the resin-reaction temperature in the dehydration stage to about 160°–170° C. and so the use of the usual steam-heated kettle equipment for making the resin. Moreover, the low acid concentration allows the use of stainless steel kettles in which to carry out the reaction without endangering the equipment.

The technical effects so obtained are most unexpected in view of experiences with sulfuric acid as a catalyst added to a reaction mass of a phenol and aqueous formaldehyde and with sulfonic acids as catalysts for the reaction of phenol (monohydroxy-benzene) or of the methyl-substituted phenols (cresols and xylenols) with formaldehyde. In the use of concentrated sulfuric acid added to the reaction mass it has been discovered that the presence of but slight amounts of water prevents the formation of the sulfonic acid in accordance with the reaction

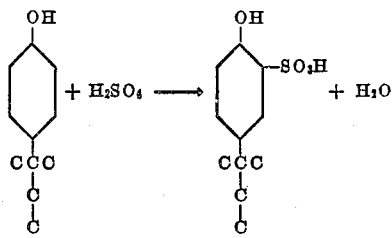

From the equation it appears that any water present before the sulfonic acid reaction takes place tends to drive the reaction in the wrong direction, and this accounts for the low melting point products from sulfuric acid added to a mixture of a phenol and aqueous formaldehyde. As far as the phenol (monohydroxy-benzene) reaction is concerned, little difference in melting point or other properties has been found between resins catalyzed by oxalic acid or sulfuric acid or sulfonic acids either of phenol as such or of one of the substituted phenols; and the same general results have been noted with respect to cresols and xylenols. The improvements become markedly apparent with the butyl, amyl, etc. and phenyl phenols.

To illustrate the invention the following examples are given. In order to provide comparative results five different catalysts were used:

(a) concentrated sulfuric acid (added to the aqueous reaction mixture);

(b) sulfonic acid in situ (made by addition to all of the phenol to be used in the reaction of concentrated (or fuming) sulfuric acid);

(c) self-sulfonic acid (approximate equimolar weights of the phenol to be used in the reaction and concentrated sulfuric acid are mixed heated to solution and thereafter dissolved in water to the desired fluidity or non-volatile content);

(d) p-tertiary-amyl-phenol-sulfonic acid (prepared as in (c) but from the amyl-phenol);

(e) oxalic acid (in relatively high amounts and greatly extended reaction time to give resins equivalent in melting point to the substituted phenol sulfonic acid).

Example 1.—This example relates to resins prepared from p-tertiary-butyl-phenol and formalin (37.5% aqueous formaldehyde) in the molar ratio of 1 of the phenol to 1.06 of the formalin.

In method (a) 900 grams of the phenol and 510 grams of formalin were heated together to about 90° C. and 0.45 gram of concentrated (96%) sulfuric acid then introduced. The temperature was taken to 100° C. under a reflux and held for 2.25 hours. This was followed by dehydration to 180° C. and a vacuum corresponding to 50 mm. of mercury before pouring. The resin had a ball-and-ring melting point of 149° F.

The same molar ratio and approximately the same percentage of concentrated sulfuric acid were used in method (b) by heating the phenol to 95° C., adding the sulfuric acid, cooling to 90° C., and then adding the formalin. Heat was applied to reach 100° C. (reflux temperature) and the reaction continued as in method (a). The resin had a melting point of 291° F.

For method (d) the special catalyst was made from 100 grams of p-tertiary-amyl-phenol to which were added 62 grams of sulfuric acid (96%), the mixture was heated to 100° C. and held for 10 minutes, and 162 grams of water added to give a solution of about 50 per cent nonvolatile. The same amounts of the phenol and formalin were heated to a smooth slurry and 1.8 grams of the special catalyst then added. Heat was applied to reflux and the procedure continued as in (b). The resin had a melting point of 212° F.

Method (e) was tried by catalyzing the mass with 2 per cent of oxalic acid, all the material being loaded into the reaction flask, heated to reflux, the temperature held for 11 hours and then dehydrated to 160° C.; the resin had a melting point of 218° F.

Example 2.—Reactions with p-secondary-butyl-phenol were carried out in this example. Method (a), applied as in Example 1 using concentrated sulfuric acid added to the reaction mixture, gave a resin that was too soft for determining the melting point by the ball-and-ring method, i. e. the melting point was below 140° F. Method (b), following that of Example 1 gave a resin with a melting point of 216° F. Method (e), catalyzed with 2 per cent of oxalic acid, gave, upon refluxing for 10 hours and dehydrating to 180° C. and 50 mm. of mercury, a resin having a melting point of 152° F.

Example 3.—P-tertiary-amyl phenol was used in this example in the molar ratio of 1 of the phenol and 1.1 of formalin. For method (a) 1250 grams of the phenol and 688 grams of the formalin had added thereto 0.55 gram of concentrated (96%) sulfuric acid, and the mass was refluxed for 28 hours before dehydrating to 180° C.; the resin had a melting point of 154° F. By following method (b) of adding the sulfuric acid to the phenol before adding the formalin, refluxing for 2.25 hours and continuing as in Example 1–b, the resin had a melting point of 285° F. Method (c) with p-tertiary-amyl-phenol-sulfonic acid as the catalyst (made as in Example 1–d) was performed by melting 5000 grams of the amyl-phenol, adding 10.7 grams of the catalyst and followed by adding 2680 grams of formalin, heating to reflux for 2 hours, and dehydrating to 160° C. (instead of 180° C.); this gave a resin melting at 262° F. The oxalic acid method (e) using 23 grams of the acid in admixture with 1150 grams of the amyl-phenol and 575 grams of formalin, refluxing for 13 hours and dehydrating to 200° C., gave a resin melting at 182° F.

Example 4.—Reactions using o-amyl-phenol in the molar ratio of 1 to 1.12 of formalin gave by method (a)—using 0.22 gram of concentrated sulfuric acid to 435 grams of the phenol, and 235 grams of formalin, and proceeding as in Example 1-a—gave a resin that was too soft to test for melting point. By method (b), of adding the sulfuric acid to the phenol and following Example 1-b, the resin had a melting point of 166° F.

Example 5.—The phenol used was p-cyclohexyl-phenol. By method (a) using the molar proportions and procedure of Example 1-a the resin had a melting point of 160° F. No resin was made by method (b) on account of the high melting point of the phenol. But by preparing a catalyst according to method (c) of adding 16.5 grams of concentrated sulfuric acid to 29.6 grams of the phenol, heating to melting and dissolving in 36 grams of water, and then including 1.8 grams of the catalyst in the reaction mass according to Example 3-c, gave a resin melting at 276° F.

Example 6.—P-phenyl phenol, 1000 grams, and formalin, 750 grams, (molar ratio 1:1.6) were reacted by method (a) with 0.5 gram of concentrated sulfuric acid for 3 hours at 135°–140° C. under 32–38 pounds pressure; upon release of pressure the resin was dehydrated to 165° C. to give a melting point of 163° F. Using the same formula but following method (b) of adding the sulfuric acid to the phenol, holding 5 minutes, adding formalin and thereafter following method 6-a, a resin was obtained melting at 286° F. According to method (d), using 2.5 grams of the special p-tertiary-amyl-phenol-sulfonic acid previously described, to the same proportions of the phenol and formalin, and thereafter following method 6-a, the resulting resin had a melting point of 261° F. The oxalic acid method (e) was applied to 1000 grams of p-phenyl-phenol, 750 grams of formalin, and 10 grams of oxalic acid by loading the ingredients into an autoclave, reacting as in 6-a and dehydrating to 140° C.; the resin melted at 197° F.

Example 7.—O-phenyl-phenol was reacted by method (a) in the proportion of 900 grams with 457 grams of formalin (1:1.03 molar ratio) and 0.45 gram of sulfuric acid; heated to reflux for 8 hours and dehydrated to 180° C. and vacuum of 50 mm. mercury; the resin was too soft to test for melting by the ball-and-ring method. The procedure was changed to that of method (b) with the same proportions and refluxing for a total of 8 hours to yield a resin melting at 160° F.

Example 8.—P-octyl-phenol was tried. According to method (a) 225 grams of the phenol, 93.5 grams of formalin and 0.11 gram of sulfuric acid, proceeding as before, gave a resin melting at 141° F. By method (b) 412 grams of the phenol, 0.21 gram of the acid and 160 grams of formalin, refluxed for 1.5 hours gave a resin melting at 246° F.

Example 9.—Nonyl-phenol, 100 grams, was treated according to method (b) with 0.054 gram of sulfuric acid and then heated with formalin as before; the resin had a melting point of 200° F. With oxalic acid (1 gram) to 50 grams of the phenol and 16.4 grams of formalin (method e) refluxed 16 hours, dehydrated to 180° C. and vacuum of 50 mm. mercury, gave a resin that was too soft for determination.

Example 10.—Mixtures of phenols are found to respond in a similar manner to a sulfonic acid catalyst.

The method (c) was applied to a mixture of 425 grams (.5 mol) p-phenyl-phenol and 375 grams (.5 mol) p-tertiary-butyl-phenol together with 480 grams (1.2 mols) of formalin by charging into a reaction vessel and heating to reflux to yield a smooth slurry. 1.6 grams of a catalyst was added—prepared by adding to 75 grams of p-tertiary-butyl-phenol 49 grams of concentrated sulfuric acid, heating at 100° C. for 10 minutes and adding 121 grams of cold water—and the mass was refluxed for 4 hours and dehydrated; dehydration could not be continued beyond a temperature of 150° C. due to the high viscosity of the resin. The resin had a melting point of 309° F.

The method (e) using oxalic acid was applied to the same mixture using 16 grams of oxalic acid, following the procedure of method (c) above, but carrying the dehydration to 180° C. The resin had a melting point of 250° F.

Example 11.—Another mixture tried was that of phenol and p-tertiary-amyl-phenol. The method (b) was used by melting 640 grams of amyl phenol in a flask and adding 0.28 gram of concentrated sulfuric acid; after 5 minutes 188 grams of phenol and 480 grams of formalin were mixed into the mass. The mass was refluxed and held for 70 minutes, whereupon it was dehydrated to 195° C. The resin melted at 250° F.

Example 12.—The same method (b) was used in reacting "Bis phenol A" (di(4-hydroxyphenyl)-dimethyl-methane) and p-tertiary-amyl-phenol by melting 604 grams of the latter, adding 0.288 gram sulfuric acid; this was followed by charging 182.4 grams of the "Bis phenol" and 480 grams of formalin and refluxing for 2 hours; dehydration was continued to 185° C. The resin had a melting point of 279° F.

Example 13.—The method (b) was also practiced by melting 480 grams of p-tertiary-amyl-phenol, adding 0.28 gram of concentrated sulfuric acid, and then charging 324 grams of p-cresol and 552 grams of formalin. After 2 hours of reflux, the resin was dehydrated to 180° C.; it had a melting point of 283° F.

Example 14.—To illustrate the utility of other saturated monoaldehydes, paraldehyde was selected. A reaction using a self-sulfonic acid catalyst (method b), was applied to 1800 grams of p-tertiary-butyl-phenol by melting (100° C.) adding 9 grams of concentrated sulfuric acid and holding for 10 minutes. The mass was poured into an autoclave, 705 grams of paraldehyde (molar ratio 0.444:1.0 of the phenol) and reacted at 130° C. for approximately 2.5 hours. After cooling the product was removed from the autoclave and dehydrated to 180° C. Before dehydration the product was a hard light-brown friable mass, and the final product was a hard, very brittle dark but transparent resin with a softening point (capillary) of 120° C.

The oxalic acid method (e) was attempted by melting 150 grams of the phenol to which was added 60 grams of paraldehyde and 10 grams of oxalic; a stronger acid was needed and 28.4 grams of hydrochloric acid were slowly added. Upon refluxing at 70°–80° C. for 1 hour and dehydrating to 250° C. (2 hours) a resin with a softening point (capillary) of 107°–110° C. was obtained. The experiment, however, was ruinous to stainless steel equipment.

The foregoing examples bring out the superior results obtained when methods (b) and (c) of adding sulfuric acid to the phenol alone are followed. The resins prepared from the p-substituted-phenols, and particularly the p-alkylsubstituted-phenols, are outstanding in their properties.

The resins can be formulated into varnishes or coating compositions with any of the drying or semi-drying or other oils found useful in such compositions, such as the fatty oils that have conjugated and non-conjugated double bonds and dry by oxidation or by heat-polymerization; suitable oils include vegetable oils as tung, oiticica, dehydrated castor oil, linseed (raw, refined and bodied), soya bean, rape seed, perilla, etc., fish oil, etc., or in general the glycerides of fatty acids having from 6 to 22 carbon atoms in the chain. The varnishes can be modified by the inclusion of other natural resins, such as rosin, copals, elemi, mastic, etc., and synthetic resins like cumarone, phenolic, etc.; and they can be modified also as to properties by plasticizers and other ingredients.

The resins can be directly dispersed in any proportion of oil; in general, however, clear solutions do not form in fatty oils until the dispersions are held at 565°–585° F. for a few minutes. With polymerizing oils, an initial short oil (15 to 25 gallons of oil for each 100 pounds of resin) dispersion type cook is used until clear, whereupon further amounts of oil can be dispersed without difficulty; with oils, such as linseed and dehydrated castor oils, any amount can be used initially. The dispersions are held at the cooking temperature for about 30 to 60 minutes, and the cooking can be continued until the desired body is reached, normally to a viscosity of about 120 to 360 centipoises as measured by a solution in thinner (mineral spirits) of 50 per cent non-volatile; for instance a linseed oil alone that when heated at 585° F. for 160 minutes reaches only a viscosity of about 20 centipoises will with the p-tertiary-amyl-phenol resin of Example 3 in a 15 gallon oil length (55 per cent by weight of oil) reach a viscosity of 270 centipoises and in a 25 gallon oil length a viscosity of 210 centipoises in the same time period.

Conventional drier combinations can be added, such as solutions of mixtures of organic salts of lead, cobalt and manganese in the proportions of about 2.5 to 3.5 cc. for each 200 grams of varnish; preferably the amount of the lead compound is reduced for medium (50–75 gal.) to long oil (100 gal.) types of varnishes.

The varnishes when properly formulated, are characterized by good through-drying, freedom from skinning, stability with basic pigments, and an infinite tolerance for petroleum solvents. Films or coatings of the varnishes have excellent durability and good chemical resistance. A 25 gallon oil length varnish of tung oil and the p-tertiary-amyl-phenol resin (Example 3) air-dries in about 4 hours, and bakes at 275° F. in 30 minutes to a hard durable film; the same length of linseed oil with the same resin air-dries in 16 hours and bakes at 275° F. in 45 minutes.

What is claimed is:

1. Process of preparing a resin soluble in fatty oils, which comprises reacting at an elevated temperature, until a resin solid at normal temperatures is formed, a saturated monoaldehyde free from reactive groups other than the aldehyde group and in approximately molar proportions with a monohydric phenol substituted solely in one of the positions ortho and para to the hydroxyl group, said substituent being a radical selected from the group consisting of phenyls, cyclo-hexyls and alkyls having more than one carbon atom, in the presence of a catalytic quantity of a sulfonic acid of a phenol selected from the said group and then dehydrating the reaction mixture.

2. Process of preparing a resin soluble in fatty oils, which comprises reacting under anhydrous conditions a monohydroxy phenol substituted solely in one of the position ortho and para to the hydroxyl group, said substituent being a radical selected from the group consisting of phenyls, cyclo-hexyls and alkyls having more than one carbon atom, with a catalytic quantity of concentrated sulphuric acid of at least 0.03 percent on the weight of the phenol to convert a portion of the phenol to a phenol-sulfonic acid, adding a saturated monoaldehyde free from reactive groups other than the aldehyde group and in approximately molar proportions to the reaction mixture, and reacting the mass at elevated temperatures until a resin solid at normal temperature is formed upon dehydration.

3. Process of preparing a resin soluble in fatty drying oil, which comprises reacting under anhydrous conditions p-tertiary-amyl-phenol with a catalytic quantity of concentrated sulphuric acid of at least 0.03% on the weight of the phenol, and reacting the so-treated phenol with aqueous formaldehyde in approximately molar proportions and at elevated temperatures until a resin solid at normal temperature is formed upon dehydration.

4. A resin soluble in fatty drying oil prepared in accordance with the process defined in claim 1.

5. A resin soluble in fatty drying oil prepared in accordance with the process defined in claim 2.

6. A resin soluble in fatty drying oil prepared in accordance with the process defined in claim 3.

7. Coating compositions comprising a fatty drying oil having incorporated therein a resin prepared in accordance with claim 1.

8. Process of preparing a coating composition which comprises adding to a fatty oil a resin prepared in accordance with the method defined by claim 1, and heating the mixture to a temperature between 565 degrees and 585 degrees F. until a clear solution is obtained and then further heating the solution to a desired viscosity.

GEORGE A. SENIOR, Jr.

REFERENCES CITED

The following references are of record in the file of this patent:

UNITED STATES PATENTS

| Number | Name | Date |
|---|---|---|
| 1,216,728 | Pollak | Feb. 20, 1917 |
| 1,989,802 | Hester et al. | Feb. 5, 1935 |
| 2,179,038 | Guthke | Nov. 7, 1939 |
| 2,207,384 | Rosenblum | July 9, 1940 |
| 2,319,359 | Wassenegger | May 18, 1943 |

FOREIGN PATENTS

| Number | Country | Date |
|---|---|---|
| 4,648 | Great Britain | 1911 |

OTHER REFERENCES

Richter-Organic Chemistry (Spielmann, 2nd ed., vol. 1., page 384 (1925). (Copy in Division 50.)